United States Patent [19]

Morishita et al.

[11] Patent Number: 4,762,194

[45] Date of Patent: Aug. 9, 1988

[54] MOTOR-DRIVEN POWER STEERING SYSTEM FOR A VEHICLE

[75] Inventors: Mitsuharu Morishita; Shinichi Kohge, both of Himeji, Japan

[73] Assignee: Mitsubishi Denki Kabushiki Kaisha, Japan

[21] Appl. No.: 27,725

[22] Filed: Mar. 19, 1987

[30] Foreign Application Priority Data

Mar. 26, 1986 [JP] Japan .................................. 61-71746
Mar. 26, 1986 [JP] Japan .................................. 61-71747

[51] Int. Cl.$^4$ .......................... B62D 5/04; B60G 17/08
[52] U.S. Cl. .................................... 180/79.1; 180/142; 280/707
[58] Field of Search ...................... 180/79.1, 142, 141, 180/143; 280/707

[56] References Cited

U.S. PATENT DOCUMENTS 4,566,718 1/1986 Kanai et al. .......................... 280/707
4,595,072 6/1986 Barnea ................................. 280/707
4,651,840 3/1987 Shimizu et al. ...................... 180/142

FOREIGN PATENT DOCUMENTS 58-139865 8/1983 Japan .
59-50864 3/1984 Japan .

Primary Examiner—John J. Love
Assistant Examiner—Donn McGiehan
Attorney, Agent, or Firm—Leydig, Voit & Mayer

[57] ABSTRACT

A motor-driven power steering system for a vehicle capable of ensuring the travelling stability of a vehicle during travel on a bad road by avoiding unintentional motion of the steering wheel caused by road surface irregularities. The power steering system includes a motor adapted to be energized by a battery to power assist the steering motion induced by an operator. The power assisting force is transmitted from the motor to the steerable road wheels through a first electromagnetic sliding clutch and a second electromagnetic switching clutch. The operations of the motor and the first and second clutches are controlled by a control unit in such a manner that the force transmitted from the motor to the steerable road wheels is reduced to make the steering operation heavier than when steering with full power assist when the vehicle is travelling on a bad road. The battery condition along with vehicle acceleration and deceleration are also detected by respective sensors to effectively avoid oversteering or to prevent damage to the steering system during acceleration and deceleration or when the battery is insufficiently charged.

30 Claims, 8 Drawing Sheets

MOTOR-DRIVEN POWER STEERING SYSTEM FOR A VEHICLE

BACKGROUND OF THE INVENTION

1. Field of the Invention

This invention relates to a motor-driven power steering system for a vehicle adapted to assist the operator-induced steering operation by means of the rotating force of a motor.

2. Description of the Prior Art

In the past, a conventional power steering system of this type, as schematically illustrated in FIG. 10, has hitherto been known in which a steering wheel 1 is operatively connected through a steering shaft 2 and a first rack and pinion gear $T_1$ including a first pinion 5 and first rack tooth portion 6a with a steering rack 6 which is connected at its opposite ends with a pair of steerable road wheels (not shown) through a pair of tie rods 8a and 8b so that when the steering wheel 1 is turned by an operator, the steerable road wheels (not shown) are appropriately steered in accordance with the steering motion of the steering wheel 1 imparted by the operator. On the other hand, the steering rack 6 is operatively connected with a motor 13 through a second rack and pinion gear $T_2$ including a second rack tooth 6b and a second pinion 18 and a speed-reduction gear R so that the driving force of the motor 13 is transmitted through the speed-reduction gear R and the second rack and pinion gear $T_2$ to the rack 6 so as to assist the steering operation of the steering wheel 1 imparted by the operator. The motor 13 is electrically connected with a battery 11 through a control unit 9 and a key or ignition switch 12 so that it is energized by the battery 11 under the control of the control unit 9. The control unit 9 is input with control signals from a steering-torque sensor 3 and a vehicle-speed sensor 10 so as to appropriately control the operation of the motor 13 and the switching clutch 17 on the basis of the steering torque and the vehicle speed measured.

The power steering system as constructed above has the following problems. Specifically, when the vehicle is travelling on a bad road having many irregularities at a relatively low speed, the steering wheel 1 is sometimes forced to turn by the road surface irregularities through the power steering system against the operator's will, thus impairing steerability. Further, when the vehicle is accelerated or decelerated, the steering force required to turn the steering wheel 1 to a predetermined angle varies, making it difficult to maintain a desired course because of the resultant inaccurate steering response. Moreover, if the power steering operation is effected when an alternator, acting to supply electricity to the battery 11, is not generating power, or when the battery 11 is not sufficiently charged, the battery 11 will be run down or exhausted in a short time.

SUMMARY OF THE INVENTION

In view of the above, the present invention has the objective of eliminating the above-described problem of the prior art, and has for its main object the provision of a novel and improved motor-driven power steering system for a vehicle which is capable of ensuring the travelling stability of a vehicle during travel on a bad road by avoiding unintentional motion of the steering wheel which would otherwise be caused by road surface irregularities with power assist.

Another object of the present invention is to provide a novel and improved motor-driven power steering system for a vehicle which can effectively avoid inaccurate steering response even during acceleration or deceleration of the vehicle and also when the battery is exhausted during power steering operation.

In order to achieve the above objects, according to one aspect of the present invention, there is provided a motor-driven power steering system for a vehicle having a steering wheel operatively connected to steer steerable road wheels in response to force exerted on by an operator, the motor-driven power steering system comprising:

a torque sensor connected to detect steering torque resulting from steering force exerted on the steering wheel by the operator and having means to generate an output signal representative thereof;

a vehicle-speed sensor connected to detect the vehicle and having means to generate an output signal representative of the detected vehicle speed;

a road-condition judging means for comparing variations representing roughness of road surfaces on which the vehicle travels with predetermined reference values and for generating an output signal representing whether road roughness is normal or exceeds a bad road condition represented by the reference values;

a motor operatively connected with the steerable road wheels and adapted to be energized by a battery to transmit a force to the steerable road wheels for power-assisting steering motion caused by the operator through the steering wheel;

an electric clutch means interposed between the motor and the steerable road wheels for selectively establishing and interrupting the transmission of the power-assisting force from the motor to the steerable road wheels; and a control unit connected to receive output signals from the torque sensor, the vehicle-speed sensor and the road-condition judging means and having means for controlling the operations of the motor and the electric clutch means to change the force transmitted from the motor to the steerable road wheels and control steering feel felt by the operator in the steering wheel.

It is preferable that the control unit comprise:

a steering-torque measuring means adapted to receive the output signal of the torque sensor for measuring the operator-induced steering torque;

a vehicle-speed measuring means adapted to receive the output signal of the vehicle-speed sensor for measuring the vehicle speed;

a vehicle-height sensor connected to measure the vehicle height relative to the road surfaces and producing an output signal representative thereof;

the road-condition judging means being connected to receive output signals of the vehicle-speed measuring means and the vehicle-height sensor and wherein the variations for judging that the vehicle is travelling on a bad road comprises the variation frequency and the variation magnitude of the output signal of the vehicle-height sensor and the variations are compared with predetermined referennce values of frequency and magnitude, respectively; and control means adapted to receive the output signal of the road-condition judging means for controlling the motor and the electric clutch means in such a manner that the power-assisting force transmitted from the motor to the steerable road wheels is decreased to make the steering feel in the steering wheel heavier when road roughness exceeds a bad road condition as determined by the road-condition judging means.

Preferably, the electric clutch means comprises an electromagnetic sliding clutch adapted to continuously change the force transmitted from the motor to the steerable road wheels, and/or an electromagnetic switching clutch disposed in series with the electromagnetic sliding clutch and adapted to switch the transmission of the power-assisting force from the motor toward the steerable road wheels on and off.

In one embodiment, the means for controlling the motor and the electric clutch means comprises;

a motor-voltage determining means for determining the voltage imposed on the motor in such a manner that the motor voltage is proportional to the operator-induced steering torque measured by the steering-torque measuring means when the road roughness is determined to be, whereas the motor voltage is decreased when the road roughness exceeds the bad road condition as determined by the road-condition judging means; and a motor-voltage controlling means for controlling the voltage imposed on the motor in accordance with the output of the motor-voltage determining means.

In another embodiment, the means for controlling the motor and the electric clutch means comprises;

a clutch-current determining means for determining the current supplied to the electromagnetic sliding clutch in such a manner that the clutch current is proportional to the steering torque measured by the steering-torque measuring means when the road roughness is determined to be normal, whereas the clutch current is decreased when the road roughness exceeds a bad road condition as determined by the road-condition judging means; and a clutch-current controlling means for controlling the current supplied to the electromagnetic sliding clutch in accordance with the output from the clutch-current determining means.

In a further embodiment, the means for controlling the motor and the electric clutch means comprises a clutch controlling means for controlling the electromagnetic switching clutch in such a manner that the electromagnetic switching clutch is switched on when the road roughness is determined to be normal, but switched off when the road roughness exceeds a bad road condition as determined by the road-condition judging means.

In a still further embodiment, the means for controlling the motor and the electric clutch means comprises;

a motor-voltage determining means for determining the voltage imposed on the motor in such a manner that the motor voltage is proportional to the steering torque measured by the steering-torque measuring means when the road roughness is determined to be normal, whereas the motor voltage is decreased when the road roughness exceeds a bad road condition as determined by the road-condition judging means;

a motor-voltage controlling means for controlling the voltage imposed on the motor in accordance with the output of the motor-voltage determining means;

a clutch-current determining means for determining the current supplied to the electromagnetic sliding clutch in such a manner that the clutch current is proportional to the steering torque measured by the steering-torque measuring means when the road roughness is determined to be normal, whereas the clutch current is decreased when the road roughness exceeds a bad road condition as determined by the road-condition judging means;

a clutch-current controlling means for controlling the current supplied to the electromagnetic sliding clutch in accordance with the output from the clutch-current determining means; and a clutch controlling means for controlling the electromagnetic switching clutch in such a manner that the electromagnetic switching clutch is switched on when the road roughness is determined to be normal, but switched off when the road roughness exceeds a bad road condition as determined by the road-condition..

According to another aspect of the present invention, there is provided a motor-driven power steering system for a vehicle comprising:

a steering wheel;

a steering shaft fixedly connected with the steering wheel for integral rotation therewith;

a vehicle-speed sensor for detecting the travelling speed of a vehicle and generating an output signal representative of the detected vehicle speed;

a torque sensor mounted on the steering shaft for detecting operator-induced torque resulting from steering force exerted on to the steering wheel by an operator and generating an output signal representative of the detected steering torque;

a vehicle-height sensor for detecting the height of the vehicle body relative to road surface to generate an output signal representative of the detected vehicle height;

a first pinion operatively connected with the steering shaft and adapted to be driven by the steering wheel through the intermediary of the steering shaft;

a rack operatively connected through tie rods with a pair of steerable road wheels and having a first rack tooth portion and a second rack tooth portion formed thereon, the first rack tooth portion being in meshing engagement with the first pinion;

a second pinion being in meshing engagement with the second rack tooth portion on the rack;

a motor adapted to be energized by a battery and operatively connected through a speed-reduction gear with the second pinion for power assisting the steering motion of the rack induced by the operator through the intermediary of the steering wheel, the steering shaft, the first pinion and the first rack tooth portion;

a first electromagnetic sliding clutch interposed between the motor and the second pinion for transmitting power therebetween substantially in proportion to the current supplied thereto;

a second electromagnetic switching clutch interposed between the motor and the second pinion for selectively establishing or disconnecting the operative connection between the motor and the second pinion; and a control unit adapted to receive output signals from the torque sensor, the vehicle-speed sensor and the vehicle-height sensor for controlling the operations of the motor, the first clutch and the second clutch.

In one embodiment, the control unit comprises:

a steering-torque measuring means adapted to receive the output signal of the torque sensor for measuring the operator-induced steering torque;

a vehicle-speed measuring means adapted to receive the output signal of the the vehicle-speed sensor for measuring the vehicle speed;

a vehicle-height measuring means adapted to receive the output signal of the vehicle-height sensor for measuring the vehicle height;

a road-condition judging means adapted to receive the outputs of the vehicle-speed measuring means and the vehicle-height measuring means for judging that the vehicle is travelling on a bad road if the variation frequency and the variation magnitude of the output signal of the vehicle-height measuring means are greater than respective predetermined levels, respectively, and if the vehicle speed measured by the vehicle-speed measuring means is less than a predetermined level;

a motor-voltage determining means for determining the voltage imposed on the motor in such a manner that the motor voltage is proportional to the steering torque value measured by the steering-torque measuring means in the normal operating condition, whereas the motor voltage is decreased if the road-condition judging means judges that the vehicle is travelling on a bad road; and a motor-voltage controlling means for controlling the voltage imposed on the motor in accordance with the output of the motor-voltage determining means.

In another embodiment, the control unit comprises:

a steering-torque measuring means adapted to receive the output signal of the torque sensor for measuring the operator-induced steering torque;

a vehicle-speed measuring means adapted to receive the output signal of the vehicle-speed sensor for measuring the vehicle speed;

a vehicle-height measuring means adapted to receive the output signal of the vehicle-height sensor for measuring the vehicle height;

a road-condition judging means adapted to receive the outputs of the vehicle-speed measuring means and the vehicle-height measuring means for judging that the vehicle is travelling on a bad road if the variation frequency and the variation magnitude of the output signal of the vehicle-height measuring means are greater than respective predetermined levels, respectively, and if the vehicle speed measured by the vehicle-speed measuring means is less than a predetermined level;

a clutch-current determining means for determining the current supplied to the electromagnetic sliding clutch in a manner such that the intensity of clutch current is proportional to the measured steering torque in the normal operating condition, whereas the clutch current is decreased if the road-condition judging means judges that the vehicle is travelling on a bad road; and a clutch-current controlling means for controlling the current supplied to the electromagnetic sliding clutch in accordance with the output from the clutch-current determining means.

In a further embodiment, the control unit comprises:

a steering-torque measuring means adapted to receive the output signal of the torque sensor for measuring the operator-induced steering torque;

a vehicle-speed measuring means adapted to receive the output signal of the the vehicle-speed sensor for measuring the vehicle speed;

a vehicle-height measuring means adapated to receive the output signal of the vehicle-height sensor for measuring the vehicle height;

a road-condition judging means adapted to receive the outputs of the vehicle-speed measuring means and the vehicle-height measuring means for judging that the vehicle is travelling on a bad road if the variation frequency and the variation magnitude of the output signal of the vehicle-height measuring means are greater than respective predetermined levels, respectively, and if the vehicle speed measured by the vehicle-speed measuring means is less than a predetermined level;

a motor-voltage determining means for determining the voltage imposed on the motor in such a manner that the motor voltage is proportional to the steering torque measured by the steering-torque measuring means in the normal operating condition, whereas the motor voltage is decreased if the road-condition judging means judges that the vehicle is travelling on a bad road; and a motor-voltage controlling means for controlling the voltage imposed on the motor in accordance with the output of the motor-voltage determining means;

a clutch-current determining means for determining the current supplied to the electromagnetic sliding clutch in such a manner that the intensity of clutch current is proportional to the measured steering torque in the normal operating condition, whereas the clutch current is decreased if the road-condition judging means judges that the vehicle is travelling on a bad road;

a clutch-current controlling means for controlling the current supplied to the electromagnetic sliding clutch in accordance with the output from the clutch-current determining means; and a clutch controlling means for controlling the electromagnetic switching clutch in such a manner that the electromagnetic switching clutch is switched on in the normal operating condition, but switched off if the road-condition judging means judges that the vehicle is travelling on a bad road.

According to a further aspect of the invention, there is provided a motor-driven power steering system for a vehicle having a steering wheel operatively connected to steer steerable road wheels in response to force exerted thereon by an operator, the motor-driven power steering system comprising:

a motor adapted to be energized by a battery which is charged by an alternator, the motor being operable to power assist the steering motion caused by the operator through the steering wheel;

an electric clutch means for controlling the power-assisting force transmitted from the motor to the steerable road wheels;

a torque sensor for detecting operator-induced steering torque resulting from the steering force exerted on the steering wheel by the operator to generate an output signal representative of the detected steering force;

a deceleration sensor for detecting the vehicle deceleration to generate an output signal representative of the detected vehicle deceleration;

an acceleration sensor for detecting the vehicle acceleration to generate an output signal representative of the detected vehicle acceleration;

a power sensor for detecting the power-generating condition of the alternator to generate an output signal representative of whether or not the alternator is generating power;

a battery sensor for detecting the charging condition of a battery to generate an output signal representative of whether or not the battery is sufficiently charged; and a control unit adapted to receive output signals from the torque sensor, the vehicle-speed sensor, the deceleration sensor, the acceleration sensor, the power sensor and the battery sensor for controlling the operations of the motor and the electric clutch means.

It is preferable that the control unit comprise:

a steering-torque measuring means adapted to receive the output signal of the torque sensor for measuring the operator-induced steering torque;

a vehicle-speed measuring means adapted to receive the output signal of the vehicle-speed sensor for measuring the vehicle speed;

a deceleration detecting means adapted to receive the output signal of the deceleration sensor and generate an output signal if the vehicle is decelerated;

an acceleration detecting means adapted to receive the output signal of the acceleration sensor and generate an output signal if the detected vehicle acceleration is greater than a predetermined acceleration level;

an alternator-power detecting means adapted to receive the output of the power sensor and generate an output signal if the alternator is generating no power;

a battery-condition detecting means adapted to receive the output of the battery sensor and generate an output signal if the charge of the battery is insufficient; and means electrically connected with the steering-torque measuring means, the vehicle-speed measuring means, the deceleration detecting means, the acceleration detecting means, the alternator-power detecting means and the battery-condition detecting means and adapted to control, upon receipt of at least one of the output signals from the deceleration detecting means, the acceleration detecting means, the alternator-power detecting means and the battery-condition detecting means, the operations of the motor and the electric clutch means in such a manner that the force transmitted from the motor to the steerable road wheels is decreased.

Preferably, the electric clutch means comprises: an electromagnetic sliding clutch adapted to continuously change the force transmitted from the motor to the steerable road wheels; and/or an electromagnetic switching clutch disposed in series with the electromagnetic sliding clutch and adapted to switch the transmission of force from the motor toward the steerable road wheels on and off.

In one embodiment, the means for controlling the operations of the motor and the electric clutch means comprises;

a motor-voltage determining means for determining the voltage imposed on the motor in such a manner that the motor voltage is proportional to the steering torque measured by the steering-torque measuring means in the normal operating condition, whereas the motor voltage is decreased if it receives at least one of the output signals from the deceleration detecting means, the acceleration detecting means, the alternator-power detecting means and the battery-condition detecting means; and a motor-voltage controlling means for controlling the voltage imposed on the motor in accordance with the output of the motor-voltage determining means.

In another embodiment, the means for controlling the operations of the motor and the electric clutch means comprises;

a clutch-current determining means for determining the current supplied to the electromagnetic sliding clutch in such a manner that the clutch current is proportional to the steering torque measured by the steering-torque measuring means in the normal operating condition, whereas the clutch current is decreased if it receives at least one of the output signals from the deceleration detecting means, the acceleration detecting means, the alternator-power detecting means and the battery-condition detecting means; and a clutch-current controlling means for controlling the current supplied to the electromagnetic sliding clutch in accordance with the output from the clutch-current determining means.

In a further embodiment, the means for controlling the operations of the motor and the electric clutch means comprises a clutch controlling means for controlling the electromagnetic switching clutch in such a manner that the electromagnetic switching clutch is switched on in the normal operating condition, but switched off if it receives at least one of the output signals from the deceleration detecting means, the acceleration detecting means, the alternator-power detecting means and the battery-condition detecting means.

In a still further embodiment, the means for controlling the operations of the motor and the electric clutch means comprises;

a clutch-current determining means for determining the current supplied to the electromagnetic sliding clutch in such a manner that the clutch current is proportional to the steering torque measured by the steering-torque measuring means in the normal operating condition, whereas the clutch current is decreased if it receives at least one of the output signals from the deceleration detecting means, the acceleration detecting means, the alternator-power detecting means and the battery-condition detecting means; and a clutch-current controlling means for controlling the current supplied to the electromagnetic sliding clutch in accordance with the output from the clutch-current determining means; and a clutch controlling means for controlling the electromagnetic switching clutch in such a manner that the electromagnetic switching clutch is switched on in the normal operating condition, but switched off if it receives at least one of the output signals from the deceleration detecting means, the acceleration detecting means, the alternator-power detecting means and the battery-condition detecting means.

According to a still further aspect of the present invention, there is provided a motor-driven power steering system for a vehicle comprising:

a steering wheel;

a steering shaft fixedly connected with the steering wheel for integral rotation therewith;

a first pinion operatively connected with the steering shaft and adapted to be driven by the steering wheel through the intermediary of the steering shaft;

a rack operatively connected through tie rods with a pair of steerable road wheels and having a first rack tooth portion and a second rack tooth portion formed thereon, the first rack tooth portion being in meshing engagement with the first pinion;

a second pinion being in meshing engagement with the second rack tooth portion on the rack;

a motor adapted to be energized by a battery which is charged by an alternator, the motor being operatively connected through a speed-reduction gear with the second pinion for power assisting the steering motion of the rack induced by the operator through the intermediary of the steering wheel, the steering shaft, the first pinion and the first rack tooth portion;

a first electromagnetic sliding clutch interposed between the motor and the second pinion for transmitting power therebetween substantially in proportion to the intensity of current supplied thereto;

a second electromagnetic switching clutch interposed between the motor and the second pinion for selectively establishing or disconnecting the operative connection between the motor and the second pinion;

a vehicle-speed sensor for detecting the travelling speed of a vehicle and generating an output signal representative of the detected vehicle speed;

a torque sensor mounted on the steering shaft for detecting operator-induced steering torque resulting from steering force exerted on the steering wheel by an operator and generating an output signal representative of the detected steering torque;

a deceleration sensor for detecting the vehicle deceleration to generate an output signal representative of the detected vehicle deceleration;

an acceleration sensor for detecting the vehicle acceleration to generate an output signal representative of the detected vehicle acceleration;

a power sensor for detecting the power-generating condition of the alternator to generate an output signal representative of whether or not the alternator is generating power;

a battery sensor for detecting the charged condition of the battery to generate an output signal representative of whether or not the battery is sufficiently charged; and a control unit adapted to receive output signals from the torque sensor, the vehicle-speed sensor, the deceleration sensor, the acceleration sensor, the power sensor and the battery sensor for controlling the operations of the motor, the first clutch and the second clutch.

In one embodiment, the control unit comprises:

a steering-torque measuring means adapted to receive the output signal of the torque sensor for measuring the operator-induced steering torque;

a vehicle-speed measuring means adapted to receive the output signal of the vehicle-speed sensor for measuring the vehicle speed;

a deceleration detecting means adapted to receive the output signal of the deceleration sensor and generate an output signal if the vehicle is decelerated;

an acceleration detecting means adapted to receive the output signal of the acceleration sensor and generate an output signal if the detected vehicle acceleration is greater than a predetermined level;

an alternator-power detecting means adapted to receive the output of the power sensor and generate an output signal if the alternator is generating no power;

a battery-condition detecting means adapted to receive the output of the battery sensor and generate an output signal if the charge of the battery is insufficient;

a motor-voltage determining means for determining the voltage imposed on the motor in such a manner that the motor voltage is proportional to the steering torque measured by the steering-torque measuring means in the normal operating condition, whereas the motor voltage is decreased if it receives at least one of the output signals from the deceleration detecting means, the acceleration detecting means, the alternator-power detecting means and the battery-condition detecting means; and a motor-voltage controlling means for controlling the voltage imposed on the motor in accordance with the output of the motor-voltage determining means.

In another embodiment, the control unit comprises:

a steering-torque measuring means adapted to receive the output signal of the torque sensor for measuring the operator-induced steering torque;

a vehicle-speed measuring means adapted to receive the output signal of the the vehicle-speed sensor for measuring the vehicle speed;

a deceleration detecting means adapted to receive the output signal of the deceleration sensor and generate an output signal if the vehicle is decelerated;

an acceleration detecting means adapted to receive the output signal of the acceleration sensor and generate an output signal if the detected vehicle acceleration is greater than a predetermined level;

an alternator-power detecting means adapted to receive the output of the power sensor and generate an output signal if the alternator is generating no power;

a battery-condition detecting means adapted to receive the output of the battery sensor and generate an output signal if the charge of the battery is insufficient;

a clutch-current determining means for determining the current supplied to the electromagnetic sliding clutch in such a manner that the clutch current is proportional to the steering torque measured by the steering-torque measuring means in the normal operating condition, whereas the clutch current is decreased if it receives at least one of the output signals from the deceleration detecting means, the acceleration detecting means, the alternator-power detecting means and the battery-condition detecting means; and a clutch-current controlling means for controlling the current supplied to the electromagnetic sliding clutch in accordance with the output from the clutch-current determining means.

In a further embodiment, the control unit comprises:

a steering-torque measuring means adapted to receive the output signal of the torque sensor for measuring the operator-induced steering torque;

a vehicle-speed measuring means adapted to receive the output signal of the the vehicle-speed sensor for measuring the vehicle speed;

a deceleration detecting means adapted to receive the output signal of the deceleration sensor and generate an output signal if the vehicle is decelerated;

an acceleration detecting means adapted to receive the output signal of the acceleration sensor and generate an output signal if the detected vehicle acceleration is greater than a predetermined level;

an alternator-power detecting means adapted to receive the output of the power sensor and generate an output signal if the alternator is generating no power;

a battery-condition detecting means adapted to receive the output of the battery sensor and generate an output signal if the charge of the battery is insufficient; and a clutch controlling means for controlling the electromagnetic switching clutch in such a manner that the electromagnetic switching clutch is switched on in the normal operating condition, but switched off if it receives at least one of the output signals from the deceleration detecting means, the acceleration detecting means, the alternator-power detecting means and the battery-condition detecting means.

In a still further embodiment, the control unit comprises:

a steering-torque measuring means adapted to receive the output signal of the torque sensor for measuring the operator-induced steering torque;

a vehicle-speed measuring means adapted to receive the output signal of the the vehicle-speed sensor for measuring the vehicle speed;

a deceleration detecting means adapted to receive the output signal of the deceleration sensor and generate an output signal if the vehicle is decelerated;

an acceleration detecting means adapted to receive the output signal of the acceleration sensor and generate an output signal if the detected vehicle acceleration is greater than a predetermined level;

an alternator-power detecting means adapted to receive the output of the power sensor and generate an output signal if the alternator is generating no power;

a battery-condition detecting means adapted to receive the output of the battery sensor and generate an output signal if the charge of the battery is insufficient;

a motor-voltage determining means for determining the voltage imposed on the motor in such a manner that the motor voltage is proportional to the steering torque measured by the steering-torque measuring means in the normal operating condition, whereas the motor voltage is decreased if it receives at least one of the output signals from the deceleration detecting means, the acceleration detecting means, the alternator-power detecting means and the battery-condition detecting means;

a motor-voltage controlling means for controlling the voltage imposed on the motor in accordance with the output of the motor-voltage determining means;

a clutch-current determining means for determining the current supplied to the electromagnetic sliding clutch in such a manner that the clutch current is proportional to the steering torque measured by the steering-torque measuring means in the normal operating condition, whereas the clutch current is decreased or made zero if it receives at least one of the output signals from the deceleration detecting means, the acceleration detecting means, the alternator-power detecting means and the battery-condition detecting means;

a clutch-current controlling means for controlling the current supplied to the electromagnetic sliding clutch in accordance with the output from the clutch-current determining means; and a clutch controlling means for controlling the electromagnetic switching clutch in such a manner that the electromagnetic switching clutch is switched on in the normal operating condition, but switched off if it receives at least one of the output signals from the deceleration detecting means, the acceleration detecting means, the alternator-power detecting means and the battery-condition detecting means.

The above and other objects, features and advantages of the present invention will become apparent from the following detailed description of several presently preferred embodiments of the invention when taken in conjunction with the accompanying drawings.

BRIEF DESCRIPTION OF THE DRAWINGS

FIGS. 1 through 6 relate to a motor-driven power steering system in accordance with one embodiment of the present invention, in which FIG. 1 is a schematic view illustrating a general arrangement of the same;

FIG. 2 is a block diagram showing a control unit and its related parts;

FIG. 3 is a graphic representation showing current-/torque characteristics of a first electromagnetic clutch;

FIG. 4 is a characteristic view showing a steering-torque/motor-voltage relationship and a steering-torque/first-clutch-current relationship;

FIG. 5 is a characteristic view showing a vehicle-speed/first-clutch-current relationship and a vehicle-speed/second-clutch-voltage relationship;

FIG. 6 is a flow chart showing the control processes of the power steering system of FIG. 1 as controlled by the control unit illustrated in FIG. 2.

FIGS. 7 through 9 relate to a motor-driven power steering system in accordance with another embodiment of the present invention, in which FIG. 7 is a view similar to FIG. 1, illustrating a general arrangement of the same;

FIG. 8 is a block diagram showing a control unit and its related parts of the same;

FIG. 9 is a flow chart showing the control processes of the power steering system of FIG. 7 as controlled by the control unit of FIG. 8.

DESCRIPTION OF THE PREFERRED EMBODIMENTS

Figure 10:
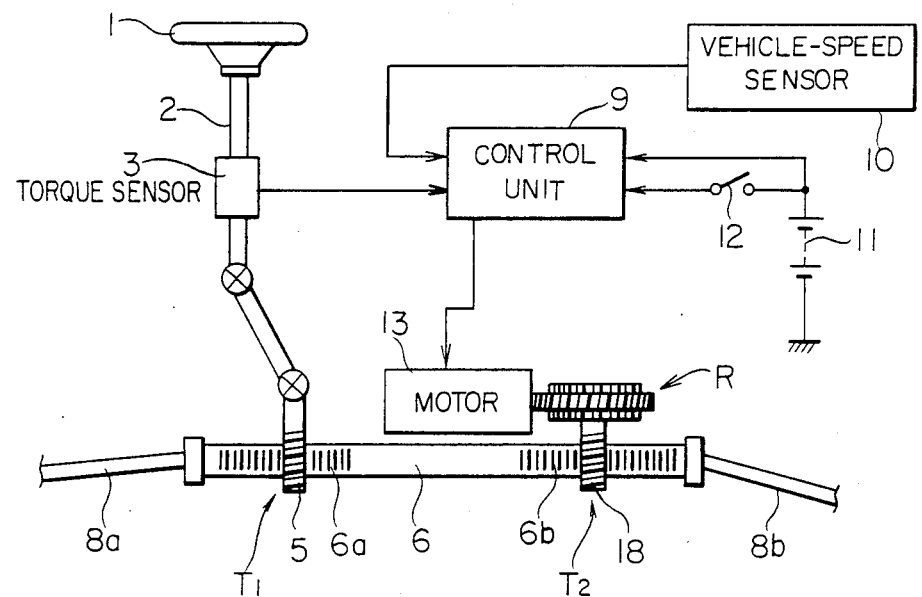
FIG. 10 is a view similar to FIG. 1, showing a general arrangement of a conventional motor-driven power steering system.

The present invention will now be described in detail with reference to several presently preferred embodiments thereof as illustrated in the accompanying drawings. In the following, the same parts or elements of the embodiments will be identified by the same reference numerals and reference characters as employed in FIG. 10.

Figure 1:
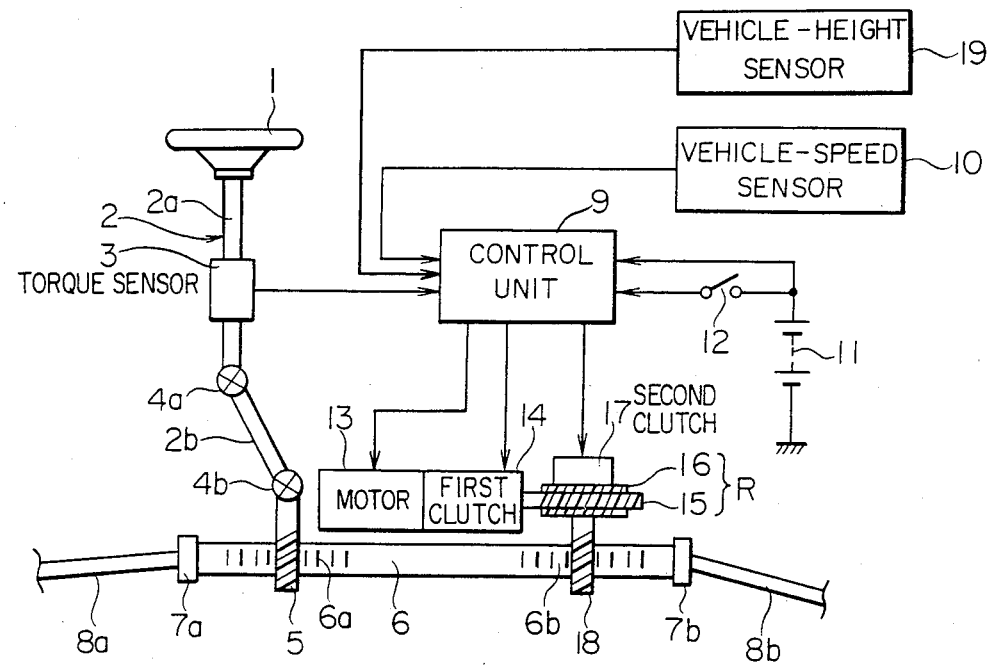

Referring to the drawings and first to FIGS. 1 through 6, there is shown a motor-driven power steering system for a vehicle constructed in accordance with a first embodiment of the present invention. FIG. 1 shows a general arrangement of the motor-driven power steering system which includes a steering wheel 1; a steering shaft 2 fixedly connected at its upper end with the steering wheel for integral rotation therewith; a torque sensor 3 mounted on the steering shaft 2 for detecting operator-induced steering torque resulting from the steering force exerted on the steering wheel 1 by an operator to generate an electrical signal representative of the detected steering torque, the steering shaft 2 including an upper section 2a and a lower section 2b joined with each other through a first universal joint 4a; a first pinion 5 operatively connected at its upper end with the lower end of the steering shaft 2 through a second universal joint 4b; a rack 6 operatively connected at its opposite ends through ball joints 7a, 7b with tie rods 8a, 8b which are in turn connected with a pair of steerable road wheels (not shown), the rack 6 having a first tooth portion 6a in mesh with the first pinion 5 and a second tooth portion 6b axially spaced from or otherwise continuous with the first tooth portion 6a; a vehicle-speed sensor 10 for detecting the travelling speed of a vehicle to generate an output signal representative of the detected vehicle speed; a battery 11 adapted to be mounted on the vehicle; a key or ignition switch 12; a second pinion 18 in meshing engagement with the second rack tooth portion 6b on the rack 6; a motor 13 operatively connected through a speed-reduction gear R with the second pinion 18 for power assisting the steering motion of the rack 6 induced by the operator, the motor being preferably in the form of a direct current motor having a shunt winding field or a magnetic field and adapted to be driven to rotate by the battery 11; a first electromagnetic clutch 14 interposed between the motor 13 and the second pinion 18 for transmitting power therebetween substantially in proportion to the current supplied thereto, the first clutch 14 being preferably in the form of an electromagnetic sliding clutch such as, for example, a powder clutch, a hysteresis clutch or the like and directly coupled, in the illustrated embodiment, with an output shaft of the motor 13; a second clutch 17 in the form of an electromagnetic switching clutch interposed between the motor 13 and the second pinion 18 for selectively establishing or disconnecting an operative connection therebetween; a vehicle-height sensor 19 for detecting the height of the vehicle body from a road surface to generate an output signal representative of the detected vehicle height; and a control unit 9 adapted to receive output signals from the torque sensor 3, the vehicle-speed sensor 10, and the vehicle-height sensor 19 for controlling the operations of the motor 13, the first and second clutches 14 and 17. In the illustrated embodiment, the speed-reduction gear R comprises a worm 15 operatively connected with an output shaft of the first sliding clutch 14, and a worm wheel 16 in mesh with the worm 15. The second electromagnetic switching clutch 17 serves to mechanically couple or disconnect the worm wheel 16 with the second pinion 18.

Figure 2:
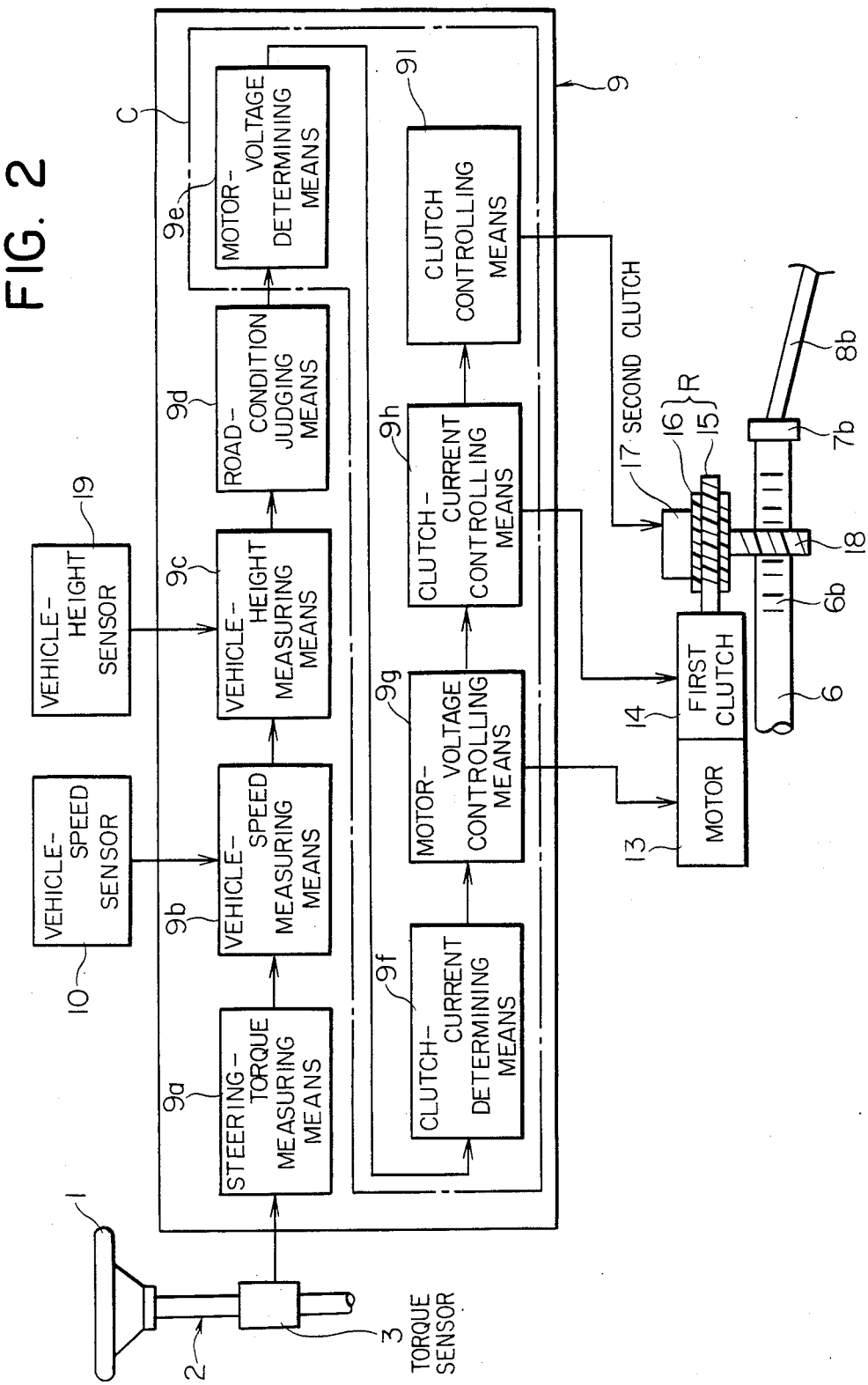

As diagrammaticaly illustrated in FIG. 2, the control unit 9 comprises a steering-torque measuring means 9a adapted to receive an output signal from the torque sensor 3 for measuring the operator-induced steering torque, a vehicle-speed measuring means 9b adapted to receive an output signal from the vehicle-speed sensor 10 for measuring the vehicle speed, a vehicle-height measuring means 9c adapted to receive an output signal from the vehicle-height sensor 19 for measuring the vehicle height, a road-condition judging means 9d adapted to receive the output signals of the vehicle-speed measuring means 9b the vehicle-height measuring means 9c for judging that the vehicle is travelling on a bad road if the variation frequency and the variation magnitude of the output signal of the vehicle-height measuring means 9c are greater than respective predetermined levels (a reference frequency and a reference magnitude) and if the output signal of the vehicle-speed measuring means 9b is less than a predetermined level (a reference vehicle speed), and means C adapted to receive the output signal of the road-condition judging means 9d for controlling the operations of the motor 13 and the electric clutch means 14 and/or 17 in such a manner that the force transmitted from the motor 13 to the steerable road wheels (not shown) is decreased to reduce or dampen the response of the power steering system to inputs in the steering wheel 1 resulting from travelling over bad road if the road-condition judging means 9d judges that the vehicle is travelling on a bad road.

In the embodiment illustrated in FIG. 2, the means C for controlling the operations of the motor 13 and the electric clutch means comprises a motor-voltage determining means 9e for determining an appropriate level of voltage imposed on the motor 13 in such a manner that the motor voltage is proportional to the steering torque measured by the steering-torque measuring means 9a in the normal operating condition, whereas the motor voltage is decreased or zero if the road-condition judging means 9d judges that the vehicle is travelling on a bad road, a clutch-current determining means 9f for determining an appropriate clutch current in a manner such that the clutch current is proportional to the steering torque measured by the steering-torque measuring means 9a in the normal operating condition, whereas the clutch current is decreased or zero if the road-condition judging means 9d judges that the vehicle is travelling on a bad road, a motor-voltage controlling means 9g for controlling the voltage to be imposed on the motor 13 on the basis of the output of the motor-voltage determining means 9e, a clutch-current controlling means 9h for controlling the current flowing through the first electromagnetic sliding clutch 14 on the basis of the output of the clutch-current determining means 9f, and a clutch controlling means 9i for controlling the second electromagnetic switching clutch 17 in such a manner that the electromagnetic switching clutch 17 is switched on in the normal operating condition, but switched off if the road-condition judging means 9d judges that the vehicle is travelling on a bad road.

Now, the operation of the power steering system of this embodiment will be described with reference to FIGS. 1 through 6. First, the case in which a vehicle is stationary or standing still will be considered. In this case, when the key switch 12 is first turned on to start the engine, the electromagnetic clutch 17 is automatically actuated to place the second pinion 18 into mechanical coupling with the worm wheel 16. In this state, when the steering wheel 1 is turned by an operator, the control unit 9 acts to control the operations of the motor 13 and the sliding clutch 14 in the manner as illustrated in FIG. 4 which shows a relationship between steering torque, motor voltage and clutch current. In this regard, it is to be noted that the steering torque as shown in FIG. 4 is an input torque periodically received when controlling the motor 13, or is an average torque when controlling the sliding clutch 14. More specifically, when steering torque increases in the righthand direction to point a in FIG. 4, the motor 13 is turned on and then imposed with 100% voltage at point b. As the steering torque further increases, current begins to flow through the electromagnetic clutch 14 at point c and the the current increases logarithmically with respect to an increase in the steering torque, and reaches 100% current at point d. On the other hand, as the steering torque decreases, current flowing through the electromagnetic sliding clutch 14 begins to decrease at point d and reaches 0% current at point c. In accordance with a further decrease in the steering torque, the motor 13 is turned off at point e so that the voltage imposed on the motor 13 becomes 0% at point f. Similar to this, the motor 13 and the electromagnetic sliding clutch 14 are controlled in the same manner when the steering torque increases or decreases in the lefthand direction.

Figure 3:
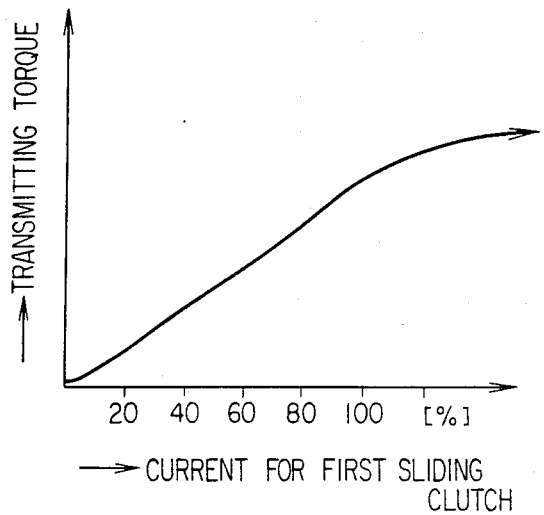
Figure 4:
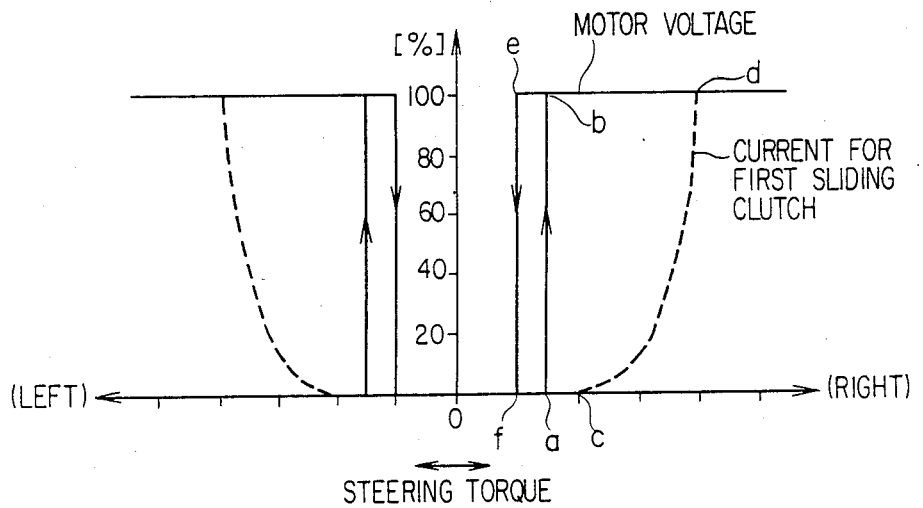

As shown in FIG. 3, the sliding clutch 14 is used in a range in which transmittting torque or sliding torque increases substantially in direct proportion to clutch current. Accordingly, as is clear from FIG. 4, the motor 13 is imposed with 100% voltage and energized to start rotating when steering torque increases to point a. As the steering torque further increases, current flowing through the sliding clutch 14 begins to gradually increase at point c so that the output torque transmitted from the sliding clutch 14 to the worm 15 increases gradually. As a result, auxiliary torque having an intensity corresponding to the turning force exerted on the steering wheel by an operator is transmitted from the motor 13 to the second tooth portion 6b on the rack 6 via the first sliding clutch 14, the worm wheel 16, the second switching clutch 17 and the second pinion 18, thereby lightening the steering operation for the operator.

Now, the case in which the vehicle is travelling at a speed less than a predetermined level (for example, 40 Km/H) is considered. In this case, if the variation frequency of the vehicle height is greater than a predetermined level (for example, 1 Hz) and if the variation magnitude of the vehicle height is greater than a predetermined level (for example, +2 cm), the road-condition judging means 9d judges that the vehicle is travelling on a bad road, as clearly shown in the flow chart of FIG. 6. As a result, the motor-voltage controlling means 9g, operated by the motor-voltage determining means 9e, acts to control the voltage imposed on the motor 13 to decrease or become zero, or the clutch-current controlling means 9h, operated by the clutch-current determining means 9f, acts to control the current supplied to the first sliding clutch 14 to decrease or become zero, or the clutch controlling means 9i operates to switch off the second electromagnetic switching clutch 17, so that the power-assist force is decreased or made zero, thereby preventing unintentional motion of the steering wheel 1 which would otherwise be caused by the road surface irregularities. This serves to improve safety in travelling as well as stability in maneuvering even during travel on a bad road.

In this connection, it is to be noted that when the road-condition judging means 9d judges that the road is bad, at least two of the motor 13, and the first and second clutches 14 and 17 may be controlled simultaneously.

Further, it is possible to omit the motor-voltage determining means 9e and the motor-voltage controlling means 9g, or the clutch-current determining means 9f and the clutch-current controlling means 9h, or the clutch controlling means 9i as necessary.

Figure 7:
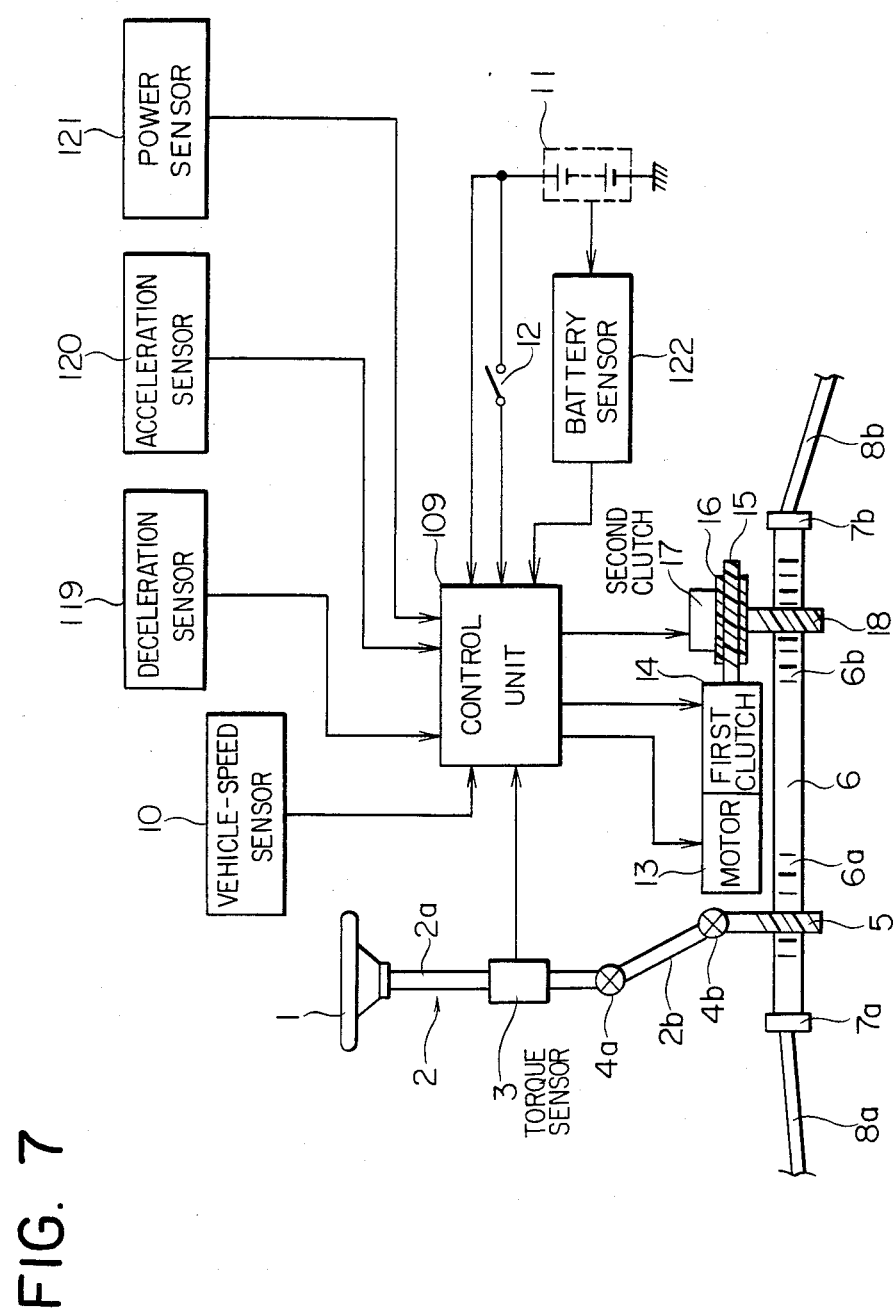
Figure 8:
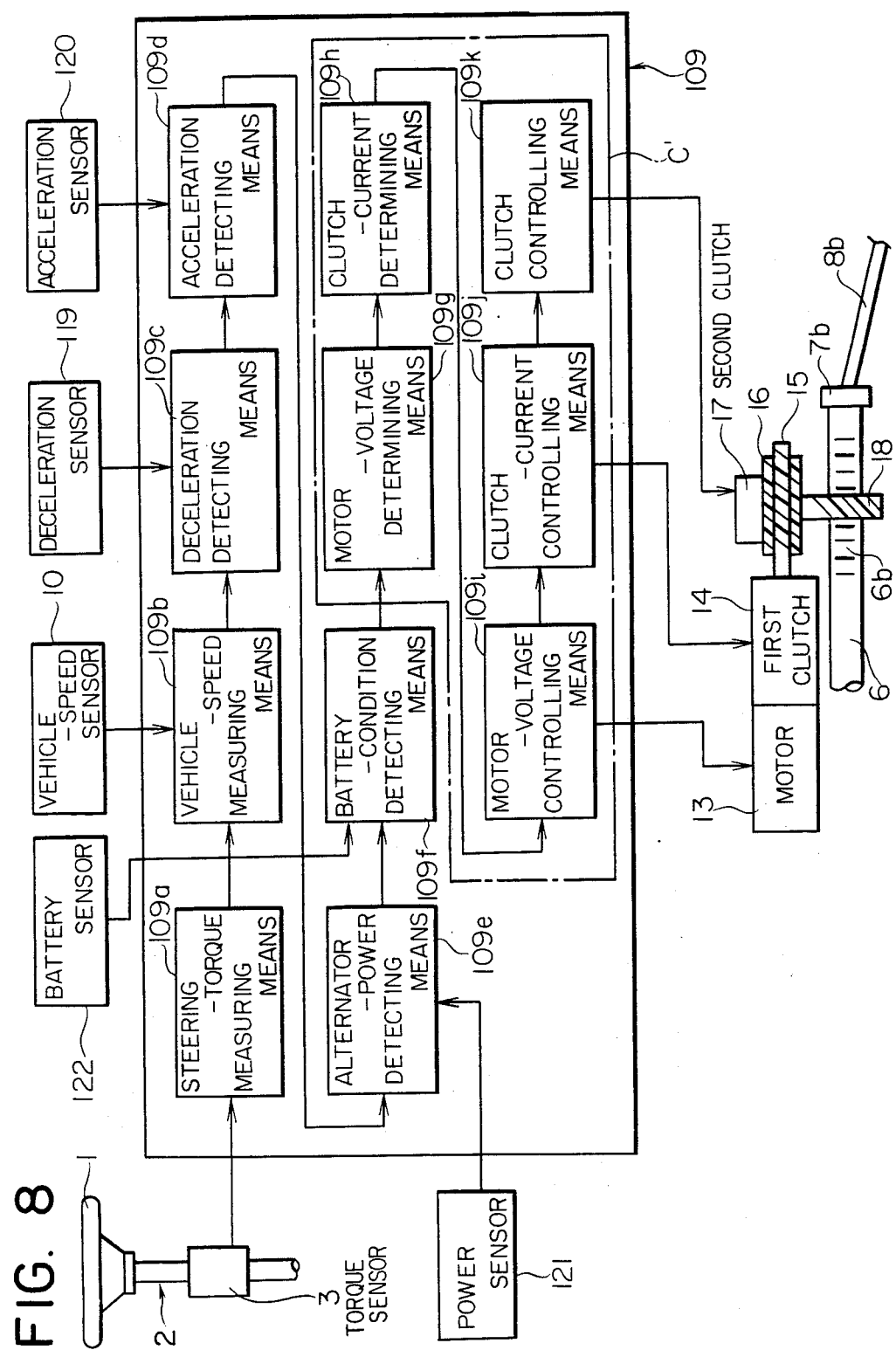
Figure 9:
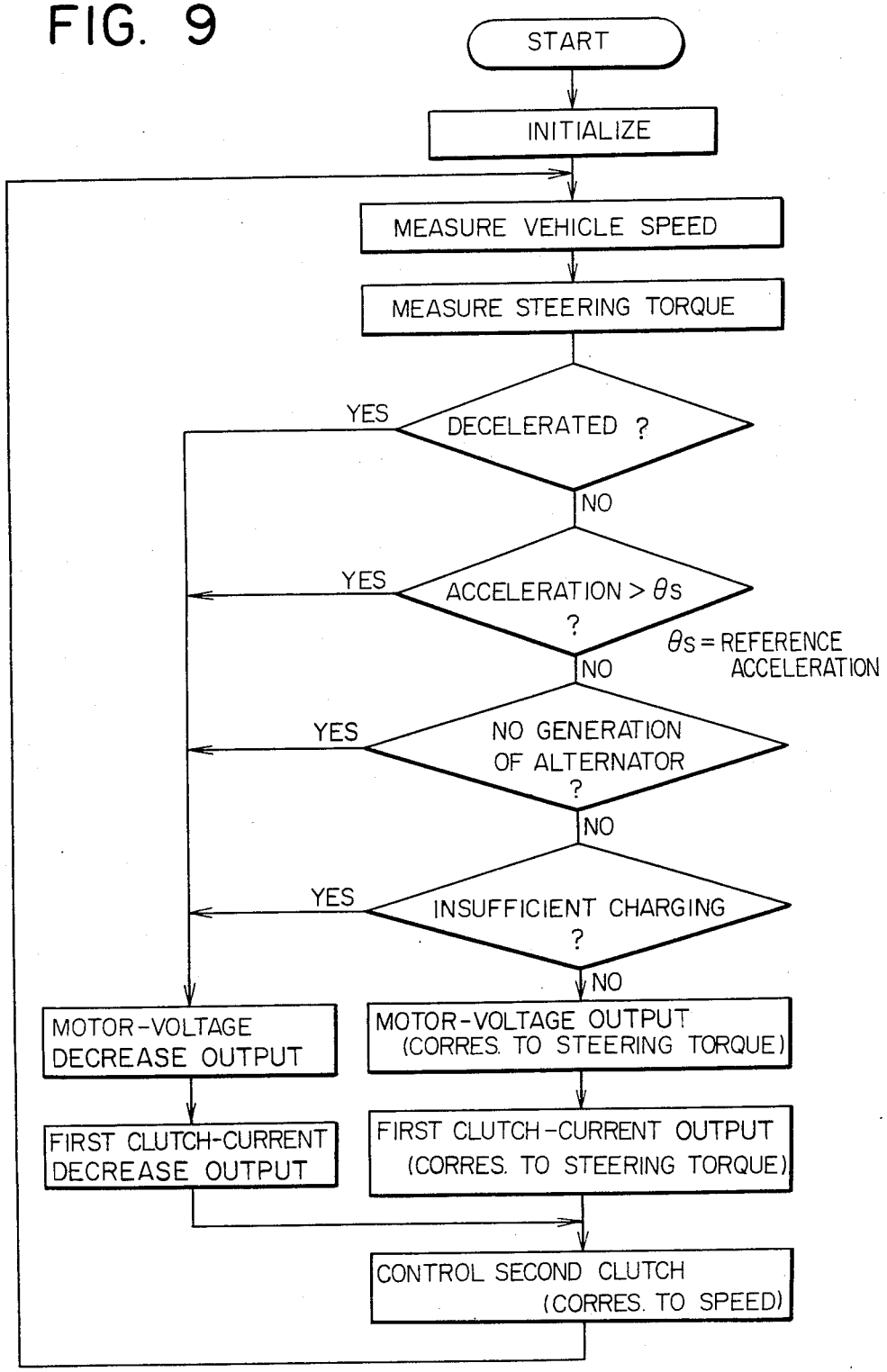

FIGS. 7 through 9 show a motor-driven power steering system in accordance with another embodiment of the present invention. As illustrated in FIG. 7, the power steering system of this embodiment is substantially similar to that shown in FIG. 1 except for the following. Specifically, in this embodiment, in place of the vehicle height sensor 19 of the FIG. 1 embodiment, there are provided a deceleration sensor 119 such as a brake sensor, a gravity sensor or the like for detecting the deceleration of a vehicle to generate an output signal representative of the detected vehicle deceleration, an acceleration sensor 120 such as a throttle-opening sensor, a gravity sensor or the like for detecting the acceleration of the vehicle to generate an output signal representative of the detected vehicle acceleration, a power sensor 121 for detecting the power-generating condition of an alternator (not shown) to generate an output signal representative of whether or not the alternator mounted on the vehicle generates power for charging the battery 11, and a battery sensor 122 for detecting the charged condition of the battery 11 to generate an output signal representative of whether or not the battery 11 is sufficiently charged. The control unit 109 of this embodiment is adapted to receive output signals from the torque sensor 3, the vehicle-speed sensor 10, the deceleration sensor 119, the acceleration sensor 120, the power sensor 121 and the battery sensor 122 for controlling the operations of motor 13, the first sliding clutch 14 and the second switching clutch 17 in an appropriate manner.

As diagrammatically illustrated in FIG. 8, the control unit 109 comprises a steering-torque measuring means 109a adapted to receive the output signal of the torque sensor 3 for measuring the operator-induced steering torque, a vehicle-speed measuring means 109b adapted to receive the output signal of the vehicle-speed sensor 10 for measuring the vehicle speed, a deceleration detecting means 109c adapted to receive the output signal of the deceleration sensor 119 and generate an output signal if the vehicle is decelerated, an acceleration detecting means 109d adapted to receive the output signal of the acceleration sensor 120 and generate an output signal if the detected vehicle acceleration exceeds a predetermined level (a reference acceleration), an alternator-power detecting means 109e adapted to receive the output signal of the power sensor 121 and generate an output signal if the alternator (not shown) is generating no power, a battery-condition detecting means 109f adapted to receive the output signal of the battery sensor 122 and generate an output signal if the battery 11 is insufficiently charged, and means C' electrically connected with the steering torque measuring means 109a, the vehicle-speed measuring means 109b, the deceleration detecting means 109c, the acceleration detecting means 109d, the alternator-power detecting means 109e and the battery-condition detecting means 109f and adapted to control, upon receipt of at least one of the output signals of the deceleration detecting means 109c, the acceleration detecting means 109d, the alternator-power detecting means 109e and the battery-condition detecting means 109f, the operations of the motor 13, the electric clutch means 14 and/or 17 in a manner such that the force transmitted from the motor 13 to the steerable road wheels (not shown) is decreased.

In the embodiment illustrated in FIG. 8, the means C' for controlling the operations of the motor 13 and the electric clutch means comprises: a motor-voltage determining means 109g for determining an appropriate level of voltage imposed on the motor 13 on the basis of the steering torque value measured by the steering-torque measuring means 109a in such a manner that the motor voltage is proportional to the measured steering torque in the normal operating condition, whereas the motor voltage is decreased if it receives at least one of the output signals from the deceleration detecting means 109c, the acceleration detecting means 109d, the alternator-power detecting means 109e and the battery-condition detecting means 109f; a clutch-current determining means 109h for determining an appropriate level of current supplied to the first sliding clutch 14 on the basis of the measured steering torque in such a manner that the clutch current is proportional to the measured steering torque in the normal operating condition, whereas the clutch current is decreased if it receives at least one of the output signals from the deceleration detecting means 109c, the acceleration detecting means 109d, the alternator-power detecting means 109e and the battery-condition detecting means 109f; a motor-voltage controlling means 109i for controlling the motor voltage on the basis of the output from the motor-voltage determining means 109g; a clutch-current controlling means 109j for controlling the clutch current supplied to the first sliding clutch 14 on the basis of the output from the clutch-current determining means 109h; and a clutch controlling means 109k for controlling the second switching clutch 17 in a manner such that the second switching clutch 17 is switched on in the normal operating condition, but switched off if it receives at least one of the output signals from the deceleration detecting means 109c, the acceleration detecting means 109d, the alternator-power detecting means 109e and the battery-condition detecting means 109f.

Figure 5:
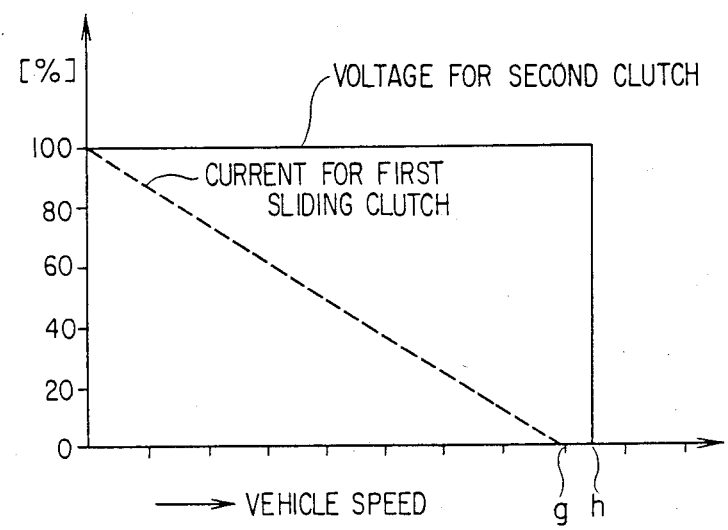
Figure 6:
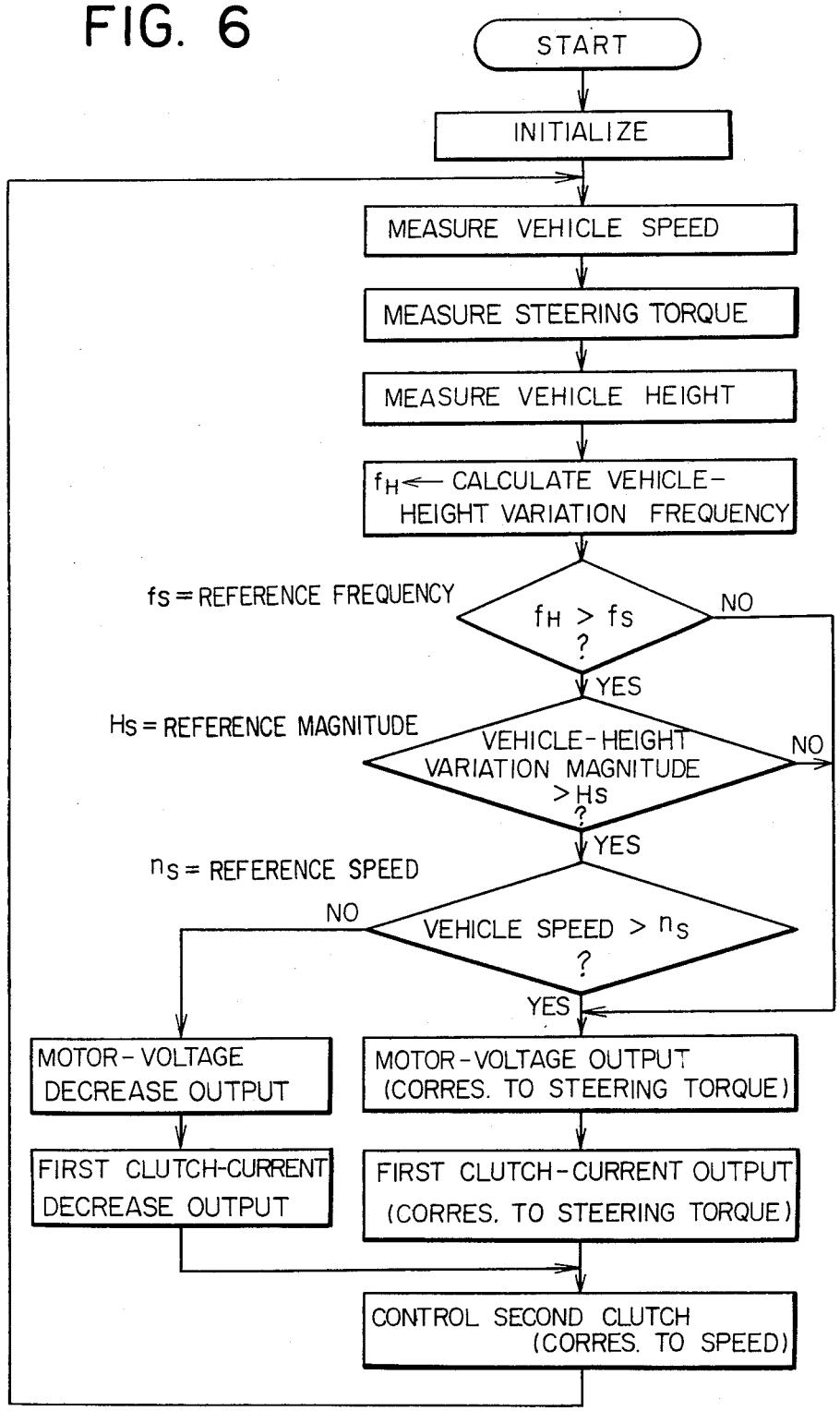

In the normal operating condition of the power steering system, the control unit 109 as constructed above operates to control the operations of the motor 13, the first sliding clutch 14 and the second switching clutch 17 in the same manner as previously described with reference to FIGS. 3 through 5.

On the other hand, in order to prevent changes in steering feel upon acceleration or deceleration of the vehicle, as well as to prevent excessive discharge of the battery 11 due to no power generation of the alternator or due to steering operation with the battery 11 insufficiently charged, the control unit 109 operates in the following manner as illustrated in FIGS. 8 and 9.

First, to cope with changes in steering feel during acceleration or deceleration of the vehicle, the deceleration detecting means 109c acts to detect from the output signal of the deceleration sensor 119 whether or not the vehicle is decelerating (for example, this is effected by detecting whether or not the brakes are being applied), and the acceleration detecting means 109d also acts to detect from the output signal of the acceleration sensor 120 whether or not the detected vehicle acceleration is greater than a predetermined level (for example, this is effected by detecting whether or not the opening degree of a throttle valve (not shown) operated through an acceleration pedal (not shown) of the vehicle exceeds a predetermined level, for example, 80% of full opening. If vehicle deceleration is detected, or if vehicle acceleration in excess of the predetermined acceleration level is detected, the motor-voltage controlling means 109i, operated by the motor-voltage determining means 109g, controls the voltage imposed on the motor 13 to decrease or become zero, and/or the clutch-current controlling means 109j, operated by the clutch-current determining means 109h, controls the current supplied to the first sliding clutch 14 to decrease or become zero, and/or the clutch controlling means 109k acts to switch off or deenergize the second switching clutch 17, thereby making the steering feel for the operator heavier so as to prevent excessive steering by the operator.

On the other hand, to cope with excessive discharge or insufficient charging of the battery 11, the power sensor 121 acts to detect whether or not the alternator (not shown) is generating power, and the battery sensor 122 acts to detect whether or not the battery 11 is sufficiently charged. If it is detected that the alternator is not generating power, or if it is detected that the battery 11 is insufficiently charged, the motor voltage imposed on the motor 13 and/or the current supplied to the first sliding clutch 14 and/or the second switching clutch 17 are controlled to decrease or become zero under the action of the motor-voltage controlling means 109i and/or the clutch-current controlling means 109j and/or the clutch controlling means 109k so that power-assist force is decreased or made zero, thus avoiding excessive discharge of the battery 11.

In the above control unit 109, it is possible to omit the motor-voltage determining means 109g and the motor-voltage controlling means 109i, or the clutch-current determining means 109h and the clutch-current controlling means 109j, or the clutch controlling means 109k as necessary.

What is claimed is:

1. A motor-driven power steering system for a vehicle having a steering wheel operatively connected to steer steerable road wheels in response to force exerted thereon by an operator, said motor-driven power steering system comprising:
    a torque sensor connected to detect operator-induced steering torque resulting from the steering force exerted on said steering wheel by the operator and having means to generate an output signal representative thereof;
    a vehicle-speed sensor connected to detect vehicle speed and having means to generate an output signal representative thereof;
    a road-condition judging means for comparing variables representing roughness of road surfaces on which the vehicle travels with predetermined reference values and for generating an output signal representing whether road roughness is normal or exceeds a bad road condition represented by the reference values;
    a motor operatively connected with said steerable road wheels and adapted to be energized by a battery to transmit a force to said steerable road wheels for power-assisting the steering motion caused by the operator through said steering wheel;
    an electric clutch means interposed between said motor and said steerable road wheels for selectively establishing and interrupting the transmission of the power-assisting force from said motor to said steerable road wheels; and
    a control unit connected to receive output signals from said torque sensor, said vehicle-speed sensor, and said road-condition judging means and having means for controlling the operations of said motor and said electric clutch means in accordance with the output signals to change the force transmitted from the motor to the steerable road wheels and controlling steering feel felt by the operator in the steering wheel.

2. A motor-driven power steering system for a vehicle according to claim 1 wherein said control unit comprises:
    a steering-torque measuring means adapted to receive the output signal of said torque sensor for measuring the operator-induced steering torque;
    a vehicle-speed measuring means adapted to receive the output signal of said vehicle-speed sensor for measuring the vehicle speed;
    a vehicle-height sensor connected to measure vehicle height relative to the road surfaces and producing an output signal representative thereof;
    said road-condition judging means being connected to receive output signals of said vehicle-speed measuring means and said vehicle-height sensor and wherein the variables for judging that the vehicle is travelling on a bad road comprise the variable frequency and the variable magnitude of the output signal of said vehicle-height sensor and the variables are compared with predetermined reference values of frequency and magnitude, respectively; and
    control means adapted to receive the output signal of said road-condition judging means for controlling the operations of said motor and said electric clutch means in such a manner that the power-assisting force transmitted from said motor to said steerable road wheels is decreased to make the steering feel in said steering wheel when road roughness exceeds a bad road condition as determined by said road-condition judging means.

3. A motor-driven power steering system for a vehicle according to claim 2 wherein said electric clutch means comprises an electromagnetic sliding clutch adapted to continuously change the power-assisting force transmitted from said motor to said steerable road wheels in accordance with the operator-induced steering torque.

4. A motor-driven power steering system for a vehicle according to claim 2 wherein said electric clutch means comprises an electromagnetic switching clutch adapted to switch on and off the transmission of the power-assisting force from said motor toward said steerable road wheels.

5. A motor-driven power steering system for a vehicle according to claim 2 wherein said electric clutch means comprises:
   an electromagnetic sliding clutch adapted to continuously change the power-assisting force transmitted from said motor to said steerable road wheels in accordance with the operator-induced steering torque; and
   an electromagnetic switching clutch disposed in series with said electromagnetic sliding clutch and adapted to switch on and off the transmission of the power-assisting force from said motor toward said steerable road wheels.

6. A motor-driven power steering system for a vehicle according to claim 2 wherein said control means comprises:
   a motor-voltage determining means for determining a voltage to be applied to said motor in accordance with the output signal of said road-condition judging means, the voltage being proportional to the operator-induced steering torque measured by said steering-torque measuring means when the road roughness is determined to be normal and decreased when the road roughness exceeds the bad road condition as determined by said road-condition judging means; and
   a motor-voltage controlling means for controlling the voltage applied to said motor in accordance with an output of said motor-voltage determining means.

7. A motor-driven power steering system for a vehicle according to claim 3 wherein said control means comprises:
   a clutch-current determining means for determining a current to be supplied to said electromagnetic sliding clutch in accordance with the output signal of said road-condition judging means, the clutch current being proportional to the operator-induced steering torque measured by said steering-torque measuring means when the road roughness is determined to be normal and decreased when the road roughness exceeds the bad road condition as determined by said road-condition judging means; and
   a clutch-current controlling means for controlling the current supplied to said electromagnetic sliding clutch in accordance with an output from said clutch-current determining means.

8. A motor-driven power steering system for a vehicle according to claim 4 wherein said control means comprises a clutch controlling means for controlling said electromagnetic switching clutch in such a manner that said electromagnetic switching clutch is switched on when the road roughness is determined to be normal but switched off when the road roughness exceeds the bad road condition as determined by said road-condition judging means.

9. A motor-driven power steering system for a vehicle according to claim 5 wherein said control means comprises:
   a clutch-current determining means for determining the current to be supplied to said electromagnetic sliding clutch in accordance with the output signal of said road-condition judging means, the clutch current being proportional to the operator-induced steering torque measured by said steering-torque measuring means when the road roughness is determined to be normal and decreased when the road roughness exceeds the bad road condition as determined by said road-condition judging means;
   a clutch-current controlling means for controlling the current supplied to said electromagnetic sliding clutch in accordance with an output from said clutch-current determining means; and
   a clutch controlling means for controlling said electromagnetic switching clutch in such a manner that said electromagnetic switching clutch is switched on when the road roughness is determined to be normal but switched off when the road roughness exceeds a bad road condition as determined by said road-condition judging means.

10. A motor-driven power steering system for a vehicle according to claim 6 wherein said control means comprises:
    a clutch-current determining means for determining a current to be supplied to said electromagnetic sliding clutch in accordance with the output signal of said road-condition judging means, the clutch current being proportional to the operator-induced steering torque measured by said steering-torque measuring means when the road roughness is determined to be normal and decreased when the road roughness exceeds the bad road condition as determined by said road-condition judging means;
    a clutch-current controlling means for controlling the current supplied to said electromagnetic sliding clutch in accordance with an output from said clutch-current determining means; and
    a clutch controlling means for controlling said electromagnetic switching clutch in such a manner that said electromagnetic switching clutch is switched on when the road roughness is determined to be normal but switched off when the road roughness exceeds the bad road condition as determined by said road-condition judging means.

11. A motor-driven power steering system for a vehicle comprising:
    a steering wheel;
    a steering shaft fixedly connected with said steering wheel for integral rotation therewith;
    a vehicle-speed sensor connected to detect travelling speed of the vehicle to generate an output signal representative of the detected vehicle speed;
    a torque sensor mounted on said steering shaft for detecting operator-induced steering torque resulting from steering force exerted on said steering wheel by an operator to generate an output signal representative of the detected steering torque;
    a vehicle-height sensor for detecting a vehicle relative to road surfaces to generate an output signal representative of the detected vehicle height;

a first pinion operatively connected with said steering shaft and adapted to be driven by said steering wheel through the intermediary of said steering shaft;

a rack operatively connected through tie rods with a pair of steerable road wheels and having a first rack tooth portion and a second rack tooth portion formed thereon, said first rack tooth portion being in meshing engagement with said first pinion;

a second pinion being in meshing engagement with said second rack tooth portion on said rack;

a motor adapted to be energized by a battery and operatively connected through a speed-reduction gear with said second pinion for power assisting the steering motion of said rack induced by the operator through an intermediary of said steering wheel, said steering shaft, said first pinion, and said first rack tooth portion;

a first electromagnetic sliding clutch interposed between said motor and said second pinion for transmitting power therebetween substantially in proportion to a current supplied thereto;

a second electromagnetic switching clutch interposed between said motor and said second pinion for selectively establishing and disconnecting the operative connection between said motor and said second pinion; and a control unit adapted to receive output signals from said torque sensor, said vehicle-speed sensor, and said vehicle-height sensor for controlling the operations of said motor, said first clutch, and said second clutch.

12. A motor-driven power steering system for a vehicle according to claim 11 wherein said control unit comprises:

a steering-torque measuring means adapted to receive the output signal of said torque sensor for measuring the operator-induced steering torque;

a vehicle-speed measuring means adapted to receive the output signal of the said vehicle-speed sensor for measuring the vehicle speed;

a vehicle-height measuring means adapted to receive the output signal of said vehicle-height sensor for measuring the vehicle height;

a road-condition judging means adapted to receive the outputs of said vehicle-speed measuring means and said vehicle-height measuring means for judging that the vehicle is travelling on a bad road if the variation frequency and the variation magnitude of the output signal of said vehicle-height measuring means are greater than respective predetermined levels and if the vehicle-speed measured by said vehicle-speed measuring means is less than a predetermined level;

a motor-voltage determining means for determining the voltage imposed on said motor in such a manner that the intensity of motor voltage is proportional to the steering torque value measured by said steering-torque measuring means in the normal operating condition, whereas the motor voltage is decreased if said road-condition judging means judges that the vehicle is travelling on a bad road; and a motor-voltage controlling means for controlling the voltage imposed on said motor in accordance with the output of said motor-voltage determining means.

13. A motor-driven power steering system for a vehicle according to claim 11 wherein said control unit comprises:

a steering-torque measuring means adapted to receive the output signal of said torque sensor for measuring the operator-induced steering torque;

a vehicle-speed measuring means adapted to receive the output signal of the said vehicle-speed sensor for measuring the vehicle speed;

a vehicle-height measuring means adapted to receive the output signal of said vehicle-height sensor for measuring the vehicle height;

a road-condition judging means adapted to receive the outputs of said vehicle-speed measuring means and said vehicle-height measuring means for judging that the vehicle is travelling on a bad road if the variation frequency and the variation magnitude of the output signal of said vehicle-height measuring means are greater than respective predetermined levels and if the vehicle speed measured by said vehicle-speed measuring means is less than a predetermined level;

a clutch-current determining means for determining the current supplied to said electromagnetic sliding clutch in such a manner that the intensity of clutch current is proportional to the measured steering torque value in the normal operating condition, whereas the clutch current is decreased if said road-condition judging means judges that the vehicle is travelling on a bad road; and a clutch-current controlling means for controlling the current supplied to said electromagnetic sliding clutch in accordance with the output from said clutch-current determining means.

14. A motor-driven power steering system for a vehicle according to claim 11 wherein said control unit comprises:

a steering-torque measuring means adapted to receive the output signal of said torque sensor for measuring the operator-induced steering torque;

a vehicle-speed measuring means adapted to receive the output signal of the said vehicle-speed sensor for measuring the vehicle speed;

a vehicle-height measuring means adapated to receive the output signal of said vehicle-height sensor for measuring the vehicle height;

a road-condition judging means adapted to receive the outputs of said vehicle-speed measuring means and said vehicle-height measuring means for judging that the vehicle is travelling on a bad road if the variation frequency and the variation magnitude of the output signal of said vehicle-height measuring means are greater than respective predetermined levels and if the vehicle speed measured by said vehicle-speed measuring means is less than a predetermined level;

a motor-voltage determining means for determining the voltage imposed on said motor in such a manner that the intensity of motor voltage is proportional to the steering torque value measured by said steering-torque measuring means in the normal operating condition, whereas the motor voltage is decreased if said road-condition judging means judges that the vehicle is travelling on a bad road; and a motor-voltage controlling means for controlling the voltage imposed on said motor in accordance with the output of said motor-voltage determining means;

a clutch-current determining means for determining the current supplied to said electromagnetic sliding clutch in such a manner that the intensity of clutch current is proportional to the measured steering torque value in the normal operating condition, whereas the clutch current is decreased if said road-condition judging means judges that the vehicle is travelling on a bad road;

a clutch-current controlling means for controlling the current supplied to said electromagnetic sliding clutch in accordance with the output from said clutch-current determining means; and a clutch controlling means for controlling said electromagnetic switching clutch in such a manner that said electromagnetic switching clutch is switched on in the normal operating condition, but switched off if said road-condition judging means judges that the vehicle is travelling on a bad road.

15. A motor-driven power steering system for a vehicle having a steering wheel operatively connected to steer steerable road wheels in response to force exerted thereon by an operator, said motor-driven power steering system comprising:

a motor adapted to be energized by a battery which is charged by an alternator, said motor being operable to power assist the steering motion caused by the operator through said steering wheel;

an electric clutch means for controlling the power-assisting force transmitted from said motor to said steerable road wheels;

a torque sensor for detecting operator-induced steering torque resulting from the steering force exerted on said steering wheel by the operator to generate an output signal representative of the detected steering force;

a deceleration sensor for detecting vehicle deceleration to generate an output signal representative of the detected vehicle deceleration;

an acceleration sensor for detecting vehicle acceleration to generate an output signal representative of the detected vehicle acceleration;

a power sensor for detecting the power-generating condition of said alternator to generate an output signal representative of whether said alternator is generating power;

a battery sensor for detecting the charged condition of a battery to generate an output signal representative of whether said battery is sufficiently charged; and a control unit adapted to receive output signals from said torque sensor, said vehicle-speed sensor, said deceleration sensor, said acceleration sensor, said power sensor, and said battery sensor for controlling the operations of said motor and said electric clutch means.

16. A motor-driven power steering system for a vehicle according to claim 15 wherein said control unit comprises:

a steering-torque measuring means adapted to receive the output signal of said torque sensor for measuring the operator-induced steering torque;

a vehicle-speed measuring means adapted to receive the output signal of said vehicle-speed sensor for measuring the vehicle speed;

a deceleration detecting means adapted to receive the output signal of said deceleration sensor and generate an output signal if the vehicle is decelerated;

an acceleration detecting means adapted to receive the output signal of said acceleration sensor and generate an output signal if the detected vehicle acceleration is greater than a predetermined acceleration level;

an alternator-power detecting means adapted to receive the output of said power sensor and generate an output signal if said alternator is generating no power;

a battery-condition detecting means adapted to receive the output of said battery sensor and generate an output signal if the charge of said battery is insufficient; and central means electrically connected with said steering-torque measuring means, said vehicle-speed measuring means, said deceleration detecting means, said acceleration detecting means, said alternator-power detecting means and said battery-condition detecting means and adapted to control, upon receipt of at least one of the output signals from said deceleration detecting means, said acceleration detecting means, said alternator-power detecting means and said battery-condition detecting means, the operations of said motor and said electric clutch means in such a manner that the force transmitted from said motor to said steerable road wheels is decreased.

17. A motor-driven power steering system for a vehicle according to claim 16 wherein said electric clutch means comprises an electromagnetic sliding clutch adapted to continuously change the force transmitted from said motor to said steerable road wheels.

18. A motor-driven power steering system for a vehicle according to claim 16 wherein said electric clutch means comprises an electromagnetic switching clutch adapted to switch the transmission of force from said motor toward said steerable road wheels on and off.

19. A motor-driven power steering system for a vehicle according to claim 16 wherein said electric clutch means comprises:

an electromagnetic sliding clutch adapted to continuously change the force transmitted from said motor to said steerable road wheels; and an electromagnetic switching clutch disposed in series with said electromagnetic sliding clutch and adapted to switch the transmission of force from said motor toward said steerable road wheels on and off.

20. A motor-driven power steering system for a vehicle according to claim 16 wherein said control means comprises;

a motor-voltage determining means for determining the voltage imposed on said motor in such a manner that the motor voltage is proportional to the steering torque measured by said steering-torque measuring means in the normal operating condition, whereas the motor voltage is decreased if it receives at least one of the output signals from said deceleration detecting means, said acceleration detecting means, said alternator-power detecting means and said battery-condition detecting means; and a motor-voltage controlling means for controlling the voltage imposed on said motor in accordance with the output of said motor-voltage determining means.

21. A motor-driven power steering system for a vehicle according to claim 17 wherein said control means comprises;
  a clutch-current determining means for determining the current supplied to said electromagnetic sliding clutch in such a manner that the clutch current is proportional to the steering torque measured by said steering-torque measuring means in the normal operating condition, whereas the clutch current is decreased if it receives at least one of the output signals from said deceleration detecting means, said acceleration detecting means, said alternator-power detecting means and said battery-condition detecting means; and
  a clutch-current controlling means for controlling the current supplied to said electromagnetic sliding clutch in accordance with the output from said clutch-current determining means.

22. A motor-driven power steering system for a vehicle according to claim 18 wherein said control means comprises a clutch controlling means for controlling said electromagnetic switching clutch in such a manner that said electromagnetic switching clutch is switched on in the normal operating condition, but switched off if it receives at least one of the output signals from said deceleration detecting means, said acceleration detecting means, said alternator-power detecting means and said battery-condition detecting means.

23. A motor-driven power steering system for a vehicle according to claim 19 wherein said control means comprises;
  a clutch-current determining means for determining the current supplied to said electromagnetic sliding clutch in such a manner that the clutch current is proportional to the steering torque measured by said steering-torque measuring means in the normal operating condition, whereas the clutch current is decreased if it receives at least one of the output signals from said deceleration detecting means, said acceleration detecting means, said alternator-power detecting means and said battery-condition detecting means;
  a clutch-current controlling means for controlling the current supplied to said electromagnetic sliding clutch in accordance with the output from said clutch-current determining means; and
  a clutch controlling means for controlling said electromagnetic switching clutch in such a manner that said electromagnetic switching clutch is switched on in the normal operating condition, but switched off it it receives at least one of the output signals from said deceleration detecting means, said acceleration detecting means, said alternator-power detecting means and said battery-condition detecting means.

24. A motor-driven power steering system for a vehicle according to claim 20 wherein said control means further comprises;
  a clutch-current determining means for determining the current supplied to said electromagnetic sliding clutch in such a manner that the clutch current is proportional to the steering torque measured by said steering-torque measuring means in the normal operating condition, whereas the clutch current is decreased if it receives at least one of the output signals from said deceleration detecting means, said acceleration detecting means, said alternator-power detecting means and said battery-condition detecting means;
  a clutch-current controlling means for controlling the current supplied to said electromagnetic sliding clutch in accordance with the output from said clutch-current determining means; and
  a clutch controlling means for controlling said electromagnetic switching clutch in such a manner that said electromagnetic switching clutch is switched on in the normal operating condition, but switched off if it receives at least one of the output signals from said deceleration detecting means, said acceleration detecting means, said alternator-power detecting means and said battery-condition detecting means.

25. A motor-driven power steering system for a vehicle comprising:
  a steering wheel;
  a steering shaft fixedly connected with said steering wheel for integral rotation therewith;
  a first pinion operatively connected with said steering shaft and adapted to be driven by said steering wheel through the intermediary of said steering shaft;
  a rack operatively connected through tie rods with a pair of steerable road wheels and having a first rack tooth portion and a second rack tooth portion formed thereon, said first rack tooth portion being in meshing engagement with said first pinion;
  a second pinion being in meshing engagement with said second rack tooth portion on said rack;
  a motor adapted to be energized by a battery which is charged by an alternator, said motor being operatively connected through a speed-reduction gear with said second pinion for power assisting the steering motion of said rack induced by the operator through an intermediary of said steering wheel, said steering shaft, said first pinion, and said first rack tooth portion;
  a first electromagnetic sliding clutch interposed between said motor and said second pinion for transmitting power therebetween substantially in proportion to a current supplied thereto;
  a second electromagnetic switching clutch interposed between said motor and said second pinion for selectively establishing and disconnecting the operative connection between said motor and said second pinion;
  a vehicle-speed sensor connected to detect travelling speed of the vehicle and generating an output signal representative of the detected vehicle speed;
  a torque sensor mounted on said steering shaft for detecting operator-induced steering torque resulting from steering force exerted on said steering wheel by an operator and generating an output signal representative of the detected steering torque;
  a deceleration sensor for detecting the vehicle deceleration to generate an output signal representative of the detected vehicle deceleration;
  an acceleration sensor for detecting the vehicle acceleration to generate an output signal representative of the detected vehicle acceleration;
  a power sensor for detecting the power-generating condition of said alternator to generate an output signal representative of whether said alternator is generating power;

a battery sensor for detecting the charged condition of said battery to generate an output signal representative of whether said battery is sufficiently charged; and a control unit adapted to receive output signals from said torque sensor, said vehicle-speed sensor, said deceleration sensor, said acceleration sensor, said power sensor, and said battery sensor for controlling the operations of said motor and said electric clutch means.

26. A motor-driven power steering system for a vehicle according to claim 25 wherein said control unit comprises:

a steering-torque measuring means adapted to receive the output signal of said torque sensor for measuring the operator-induced steering torque;

a vehicle-speed measuring means adapted to receive the output signal of the said vehicle-speed sensor for measuring the vehicle speed;

a deceleration detecting means adapted to receive the output signal of said deceleration sensor and generate an output signal if the vehicle is decelerated;

an acceleration detecting means adapted to receive the output signal of said acceleration sensor and generate an output signal if the detected vehicle acceleration is greater than a predetermined level;

an alternator-power detecting means adapted to receive the output of said power sensor and generate an output signal if said alternator is generating no power;

a battery-condition detecting means adapted to receive the output of said battery sensor and generate an output signal if charging of said battery is insufficient;

a motor-voltage determining means for determining the voltage imposed on said motor in such a manner that the motor voltage is proportional to the steering torque measured by said steering-torque measuring means in the normal operating condition, whereas the motor voltage is decreased if it receives at least one of the output signals from said deceleration detecting means, said acceleration detecting means, said alternator-power detecting means and said battery-condition detecting means; and a motor-voltage controlling means for controlling the voltage imposed on said motor in accordance with the output of said motor-voltage determining means.

27. A motor-driven power steering system for a vehicle according to claim 25, wherein said control unit comprises:

a steering-torque measuring means adapted to receive the output signal of said torque sensor for measuring the operator-induced steering torque;

a vehicle-speed measuring means adapted to receive the output signal of the said vehicle-speed sensor for measuring the vehicle speed;

a deceleration detecting means adapted to receive the output signal of said deceleration sensor and generate an output signal if the vehicle is decelerated;

an acceleration detecting means adapted to receive the output signal of said acceleration sensor and generate an output signal if the detected vehicle acceleration is greater than a predetermined level;

an alternator-power detecting means adapted to receive the output of said power sensor and generate an output signal if said alternator is generating no power;

a battery-condition detecting means adapted to receive the output of said battery sensor and generate an output signal if the charge of said battery is insufficient;

a clutch-current determining means for determining the current supplied to said electromagnetic sliding clutch in such a manner that the clutch current is proportional to the steering torque measured by said steering-torque measuring means in the normal operating condition, whereas the clutch current is decreased if it receives at least one of the output signals from said deceleration detecting means, said acceleration detecting means, said alternator-power detecting means and said battery-condition detecting means; and a clutch-current controlling means for controlling the current supplied to said electromagnetic sliding clutch in accordance with the output from said clutch-current determining means.

28. A motor-driven power steering system for a vehicle according to claim 25 wherein said control unit comprises:

a steering-torque measuring means adapted to receive the output signal of said torque sensor for measuring the operator-induced steering torque;

a vehicle-speed measuring means adapted to receive the output signal of the said vehicle-speed sensor for measuring the vehicle speed;

a deceleration detecting means adapted to receive the output signal of said deceleration sensor and generate an output signal if the vehicle is decelerated;

an acceleration detecting means adapted to receive the output signal of said acceleration sensor and generate an output signal if the detected vehicle acceleration is greater than a predetermined level;

an alternator-power detecting means adapted to receive the output of said power sensor and generate an output signal if said alternator is generating no power;

a battery-condition detecting means adapted to receive the output of said battery sensor and generate an output signal if the charge of said battery is insufficient; and a clutch controlling means for controlling said electromagnetic switching clutch in such a manner that said electromagnetic switching clutch is switched on in the normal operating condition, but switched off if it receives at least one of the output signals from said deceleration detecting means, said acceleration detecting means, said alternator-power detecting means and said battery-condition detecting means.

29. A motor-driven power steering system for a vehicle according to claim 25 wherein said control unit comprises:

a steering-torque measuring means adapted to receive the output signal of said torque sensor for measuring the operator-induced steering torque;

a vehicle-speed measuring means adapted to receive the output signal of the said vehicle-speed sensor for measuring the vehicle speed;

a deceleration detecting means adapted to receive the output signal of said deceleration sensor and generate an output signal if the vehicle is decelerated;

an acceleration detecting means adapted to receive the output signal of said acceleration sensor and generate an output signal if the detected vehicle acceleration is greater than a predetermined level;

an alternator-power detecting means adapted to receive the output of said power sensor and generate an output signal if said alternator is generating no power;

a battery-condition detecting means adapted to receive the output of said battery sensor and generate an output signal if the charge of said battery is insufficient;

a motor-voltage determining means for determining the voltage imposed on said motor in such a manner that the motor voltage is proportional to the steering torque measured by said steering-torque measuring means in the normal operating condition, whereas the motor voltage is decreased if it receives at least one of the output signals from said deceleration detecting means, said acceleration detecting means, said alternator-power detecting means and said battery-condition detecting means;

a motor-voltage controlling means for controlling the voltage imposed on said motor in accordance with the output of said motor-voltage determining means;

a clutch-current determining means for determining the current supplied to said electromagnetic sliding clutch in such a manner that the clutch current is proportional to the steering torque measured by said steering-torque measuring means in the normal operating condition, whereas the clutch current is decreased or made zero if it receives at least one of the output signals from said deceleration detecting means, said acceleration detecting means, said alternator-power detecting means and said battery-condition detecting means;

a clutch-current controlling means for controlling the current supplied to said electromagnetic sliding clutch in accordance with the output from said clutch-current determining means; and a clutch controlling means for controlling said electromagnetic switching clutch in such a manner that said electromagnetic switching clutch is switched on in the normal operating condition, but switched off if it receives at least one of the output signals from said deceleration detecting means, said acceleration detecting means, said alternator-power detecting means and said battery-condition detecting means.

30. A motor-driven power steering system for a vehicle according to claim 1 including:

a vehicle-height sensor connected to detect vehicle height relative to the road surfaces and having means to produce output signals representative thereof; and said road-condition judging means including means for comparing variations in the vehicle-height sensor means output signals with reference values for determining whether road roughness is normal or representative of a bad road.

* * * * *